United States Patent
Dhodapkar

(10) Patent No.: US 7,502,914 B2
(45) Date of Patent: Mar. 10, 2009

(54) TRANSITIVE SUPPRESSION OF INSTRUCTION REPLAY

(75) Inventor: Ashutosh S. Dhodapkar, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 136 days.

(21) Appl. No.: 11/496,225

(22) Filed: Jul. 31, 2006

(65) Prior Publication Data

US 2008/0028193 A1    Jan. 31, 2008

(51) Int. Cl.
*G06F 9/00* (2006.01)
(52) U.S. Cl. ........................ 712/214
(58) Field of Classification Search ........... 712/214
See application file for complete search history.

(56) References Cited

U.S. PATENT DOCUMENTS

| | | | | |
|---|---|---|---|---|
| 5,619,662 A * | 4/1997 | Steely et al. | ........... | 712/216 |
| 5,938,775 A * | 8/1999 | Damani et al. | ........... | 714/15 |
| 6,427,207 B1 * | 7/2002 | Col et al. | ........... | 712/245 |
| 6,463,523 B1 * | 10/2002 | Kessler et al. | ........... | 712/216 |
| 6,553,482 B1 * | 4/2003 | Witt | ........... | 712/216 |
| 6,694,424 B1 * | 2/2004 | Keller et al. | ........... | 712/216 |
| 6,981,129 B1 * | 12/2005 | Boggs et al. | ........... | 712/218 |
| 7,055,021 B2 | 5/2006 | Kadambi | | |
| 7,203,817 B2 | 4/2007 | Yeh | | |
| 2002/0138714 A1 * | 9/2002 | Leibholz et al. | ........... | 712/217 |
| 2003/0061470 A1 * | 3/2003 | Yeh | ........... | 712/219 |

OTHER PUBLICATIONS

Kim, Ilhyun and Mikko H. Lipasti, "Understanding Scheduling Replay Schemes", Proceedings of the 10th International Symposium on High-performance Computer Architecture (HPCA-10), Madrid, Spain, Feb. 2004, pp. 1-12.

* cited by examiner

*Primary Examiner*—Eric Coleman
(74) *Attorney, Agent, or Firm*—Lawrence J. Merkel; Meyertons, Hood, Kivlin, Kowert & Goetzel, P.C.

(57) ABSTRACT

In one embodiment, a processor comprises one or more execution resources configured to execute instruction operations and a scheduler coupled to the execution resources. The scheduler is configured to maintain an ancestor tracking vector (ATV) corresponding to each given instruction operation in the scheduler, wherein the ATV identifies instruction operations which can cause the given instruction operation to replay. The scheduler is configured to set the ATV of the given instruction operation to a null value in response to the given instruction operation being dispatched to the scheduler, and is configured to create the ATV of the given instruction operation dynamically as source operands of the given instruction operation are resolved.

19 Claims, 5 Drawing Sheets

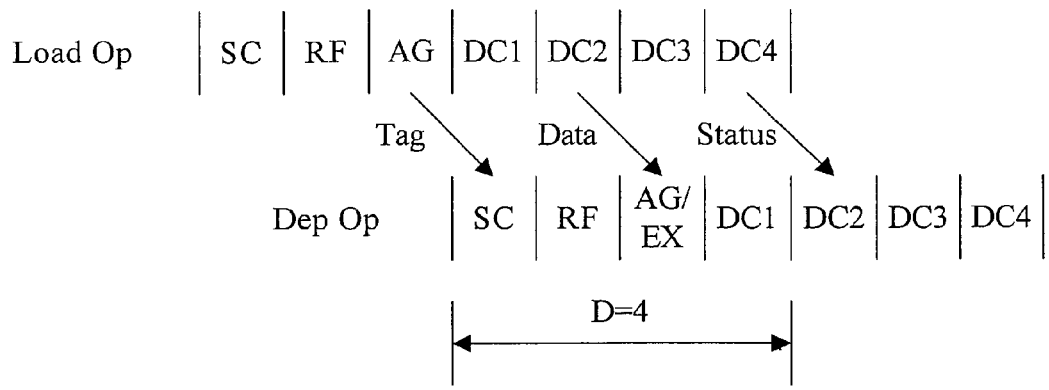

ATV_Size = D * Load_Issue_Width

Fig. 2

| Event | Result |
|---|---|
| Dispatch to Scheduler Entry i | ATV[i]=0 |
| Tag Broadcast (Load Op) | Broadcast_ATV=ATV[Load Entry] \| ATV_Assign |
| Tag Broadcast (Other Op) | Broadcast_ATV=ATV[OP Entry] |
| Tag Match - Entry i | ATV[i] = ATV[i] \| Broadcast_ATV |
| Status Broadcast (Load Op) | Status_ATV = ATV_Assign |
| Status_ATV Match - Entry i (Status_ATV & ATV[i] non-zero) | Kill[i] = ATV[i] & Status_ATV & Status_Bad<br>ATV[i] = ATV[i] & ~Status_ATV |

TRANSITIVE SUPPRESSION OF INSTRUCTION REPLAY

BACKGROUND

1. Field of the Invention

This invention is related to processors and, more particularly, to instruction replay mechanisms in processors.

2. Description of the Related Art

Managing power consumption in processors is increasingly becoming a priority. In many systems, the power supply is at least sometimes a battery or other stored-charge supply. Maximizing battery life in such systems is often a key selling feature. Additionally, even in systems that have effectively limitless power (e.g. systems plugged into a wall outlet), the challenges of cooling the processors and other circuits in the system may be reduced if power consumption can be reduced in the processors.

Some processors implement replay, in which an instruction (or instruction operation) is issued for execution and, during execution, a condition is detected that causes the instruction to be reissued again at a later time. Instructions can also be replayed if a preceding instruction is replayed (particularly if the instructions depend on the previous instructions). If an instruction is replayed due to a condition that may take some time to clear, it is likely that the instruction will be issued and replayed repeatedly until the condition is cleared. The power consumed in issuing the instruction, only to be replayed, is wasted.

Furthermore, performance is impacted since the replayed instructions occupy issue slots that could otherwise be occupied by instructions that would not be replayed. This can lead to power/performance variability on a workload-specific basis, which is undesirable. Still further, extensive replay scenarios complicate verification of the processor, increasing the likelihood that bugs will pass into the fabricated design.

SUMMARY

In one embodiment, a processor comprises one or more execution resources configured to execute instruction operations and a scheduler coupled to the execution resources. The scheduler is configured to maintain an ancestor tracking vector (ATV) corresponding to each given instruction operation in the scheduler, wherein the ATV identifies instruction operations which can cause the given instruction operation to replay. The scheduler is configured to set the ATV of the given instruction operation to a null value in response to the given instruction operation being dispatched to the scheduler, and is configured to create the ATV of the given instruction operation dynamically as source operands of the given instruction operation are resolved.

In one implementation, the scheduler comprises a buffer comprising a plurality of entries, wherein each entry of the plurality of entries is configured to store one or more source tags corresponding to source operands of a different instruction operation in the scheduler. The scheduler also comprises an ATV buffer comprising a second plurality of entries, wherein each entry of the second plurality of entries is configured to store an ATV corresponding to a given instruction operation in the scheduler. The ATV identifies instruction operations which can cause the given instruction operation to replay. Coupled to each entry of the second plurality of entries, logic is configured to set the ATV of the given instruction operation to a null value in response to the given instruction operation being dispatched to the scheduler, and is configured to dynamically create the ATV of the given instruction operation as source operands of the given instruction operation are resolved.

In an embodiment, a method comprising dispatching an instruction operation to a scheduler; setting an ancestor tracking vector (ATV) corresponding to the instruction operation to a null value responsive to the dispatching; and dynamically updating the ATV with an ATV corresponding to an executed instruction operation if the executed instruction operation resolves a source operand from the instruction operation.

In another embodiment, a processor comprises one or more execution resources configured to execute instruction operations; a scheduler coupled to the execution resources; and an ATV assignment unit. The scheduler is configured to maintain an ATV corresponding to each given instruction operation in the scheduler, wherein the ATV identifies instruction operations which can cause the given instruction operation to replay within a replay window. The ATV assignment unit is configured to assign an ATV token to an executing instruction operation that can originate a replay chain. The ATV token uniquely identifies the instruction operation with regard to other instruction operations within the replay window that can originate a replay chain.

BRIEF DESCRIPTION OF THE DRAWINGS

The following detailed description makes reference to the accompanying drawings, which are now briefly described.

FIG. 2 is a pipeline diagram illustrating a portion of one embodiment of a pipeline.

FIG. 3 is a table illustrating various events in one embodiment of a processor and one embodiment of a result from those events.

Figure 1:
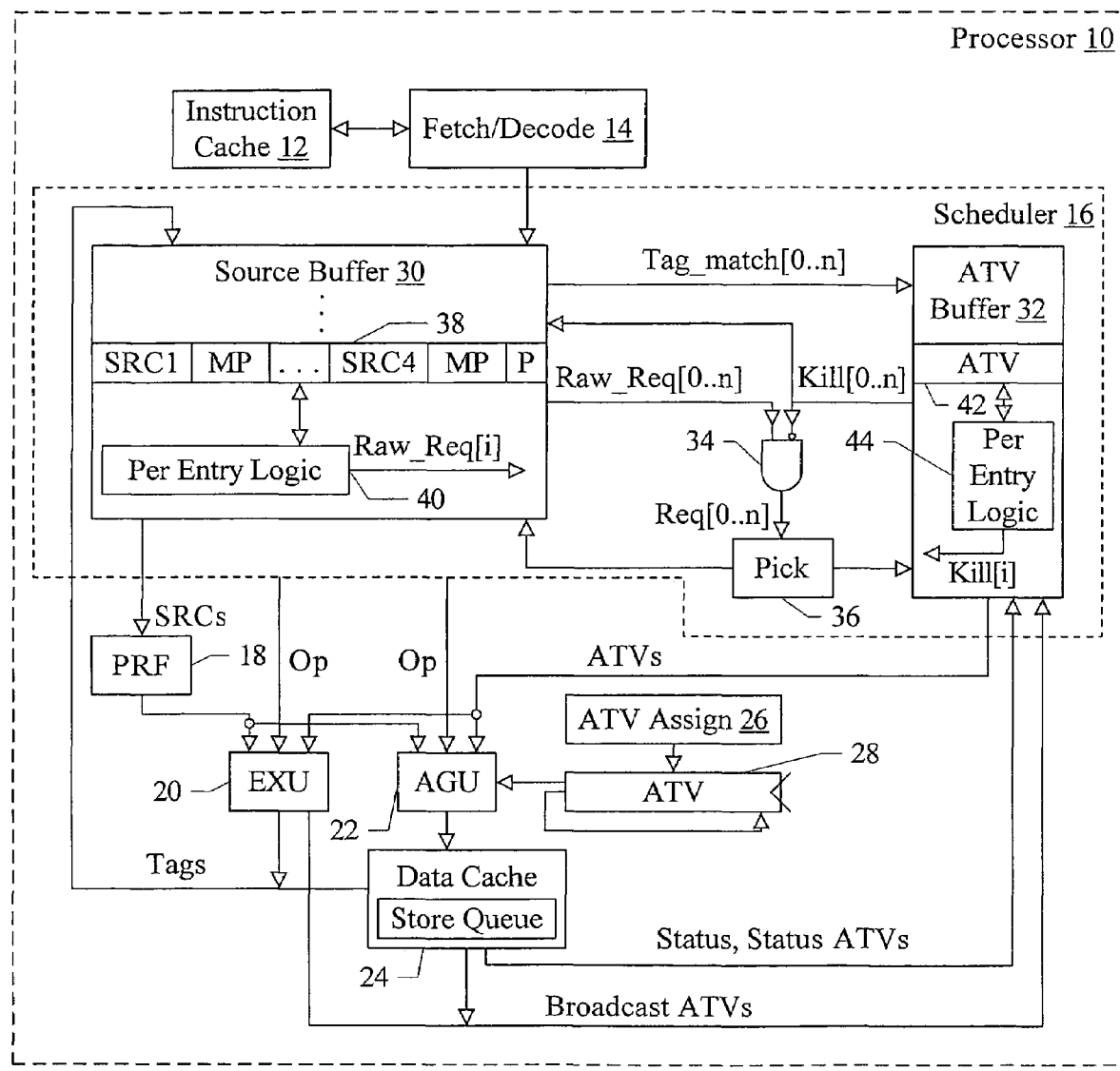
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a portion of a processor 10 is shown. In the illustrated embodiment, the processor 10 includes an instruction cache 12, a fetch/decode unit 14, a scheduler 16, a physical register file (PRF) 18, an execution unit (EXU) 20, an address generation unit (AGU) 22, a data cache 24, an ancestor tracking vector (ATV) assign unit 26, and an ATV register 28. The instruction cache 12 is coupled to the fetch/decode unit 14, which is coupled to the scheduler 16. The scheduler 16 is further coupled to the register file 18, the EXU 20, the AGU 22, and the data cache 24. The AGU 22 is coupled to the data cache 24 and the ATV register 28, which is further coupled to the ATV assign unit 26.

In the illustrated embodiment, the scheduler 16 comprises a source buffer 30, an ATV buffer 32, ATV qualifying logic 34, and pick logic 36. The source buffer 30 is coupled to the ATV buffer 32, the ATV qualifying logic 34, and the pick logic 36. The source buffer 30 comprises a plurality of entries such as entry 38 and corresponding per entry logic 40 coupled thereto. The ATV buffer 32 is coupled to the ATV qualifying logic 34 and the pick logic 36, and the ATV buffer 32 comprises a plurality of entries such as entry 42 and corresponding per entry logic 44 coupled thereto.

The scheduler 16 may be configured to maintain an ATV for each instruction operation in the scheduler. The ATV for a given instruction operation identifies preceding instruction operations in the scheduler which can directly cause replay and on which the given instruction operation depends, either directly or indirectly, for a source operand. Instruction operations which can directly cause replay include instruction operations which can experience data misspeculation, for example. Load instruction operations (or more briefly, "loads") can experience data misspeculation. For example, loads may be speculated to hit in the data cache 24, and dependent instruction operations may be scheduled presuming that the load data will be available at a clock cycle consistent with a cache hit. Data may be forwarded from the data cache 24 prior to detecting the hit, in some embodiments, which may allow data to propagate to subsequent instruction operations that are indirectly dependent on the loads through the intermediate instruction operations that use the load result and generate in inaccurate result themselves. Other conditions besides a cache miss may cause data misspeculation as well, described in more detail below. Instruction operations which can directly cause replay may also be referred to as instruction operations which can originate a replay chain. A replay chain may be a set of instruction operations that replay, directly or indirectly, due to the same event (such as a data misspeculation for a load). For example, instruction operations that are directly or indirectly dependent on the load data may be part of the replay chain.

The ATV for each instruction operation may be set to a null value, indicating no preceding instructions which can cause replay, when the instruction operation is dispatched into the scheduler to await scheduling and issuance. The ATV may be dynamically generated as instruction operations are scheduled and dependencies for source operands are resolved. The ATV may thus be made small compared to the number of instructions that may be in the processor pipeline. That is, the ATV may be sized to cover those instruction operations that can directly cause a replay to occur (e.g. loads) and that can be in the pipeline between the point in the pipeline at which the instruction operation indicates to the scheduler that dependent instruction operations can be scheduled (e.g. via a broadcast of a tag that identifies the destination register of the instruction operation) and the point in the pipeline that the replay event (e.g. data misspeculation) is signaled. Since the ATV is relatively small, the hardware cost may be relatively small, and the hardware may be more power efficient than may be possible with a larger ATV.

Furthermore, the ATV may be transitive. That is, once a given load is resolved (either misspeculated or not), the ATVs may be updated to remove that load's representation in the ATV. If the load is replayed, the ATV may be again updated to reflect the load (and in fact the ATV token assigned to the load may be different in the replay). Thus, complicated book keeping that often may be associated with tagging loads with a fixed ATV token for their entire lifetime to retirement may be avoided, in some embodiments. While various embodiments may have any instruction operation that can directly cause a replay, the remainder of the discussion will use loads as an example.

The ATV may be used to suppress requests for scheduling by instructions that are dependent on a load that has bad status (e.g. data misspeculation has occurred), thus preventing replay of those operations until the previous load executes correctly. Thus, power may be conserved and performance may be improved by scheduling instructions which have a higher probability of not replaying, in some embodiments.

Generally, the ATV may comprise one indication for each possible load that can be in flight between the tag broadcast stage and the status broadcast stage, at which replay events are identified by broadcasting status of the load. In one embodiment, each indication in the ATV of a given instruction operation may be a bit that indicates, when set, that the given instruction operation is directly or indirectly dependent on the load that is assigned to that bit in the ATV. When the bit is clear, the given instruction operation is not dependent on the load, the dependency has not yet been detected, or the dependency has been resolved via the status broadcast of the load. Thus, the ATV may be a bit vector in such an embodiment. The null value of the ATV may be the value which indicates no dependencies on instruction operations which can replay. Thus, for the bit vector example, a bit vector with the bits all set to zero may be the null value. This bit vector will be used as an example for the embodiments described herein, although other embodiments may use the opposite meanings for the set and clear states of the bit or other indications.

The ATV assign unit 26 may be configured to assign ATV tokens to instruction operations that can directly cause replay (e.g. loads). The ATV token may uniquely identify the corresponding load within the ATV. For a bit vector as mentioned above, the ATV token may be a vector of equal length to the ATV, and may be one-hot encoded. Each load may be assigned a different one-hot token. Since ATVs are maintained transitively, the association of a given load and a given ATV token ends when the status of the load is broadcast. Thus, tokens may automatically be recycled. The ATV assign unit 26 may detect that a load has been scheduled and issued to the AGU 22, and may assign the ATV in the ATV register 28 to the load. The ATV assign unit 26 may cause the ATV register 28 to update to the next ATV token. For example, the ATV register 28 may be initialized to all binary zeros except a binary one in the least significant bit. Each time an ATV token is assigned, the ATV assign unit 26 may trigger the ATV register 28 to left shift by one bit, creating the next token. The most significant bit of the ATV register 28 wraps around to the least significant bit to automatically reuse the first ATV token after the last ATV token is assigned.

The general flow of instructions/instruction operations in the processor 10 will next be described, to provide context for the details of one embodiment of the scheduler 16. The fetch/decode unit 14 may fetch instructions from the instruction cache 12 and decode them into instruction operations for the scheduler 16. The fetch/decode unit 14 may implement branch prediction to speculatively fetch down a given path in the code being executed. In some embodiments, the processor 10 may implement register renaming to rename the architectural registers to the physical registers in the register file 18. If so, the fetch/decode unit 14 may perform the renaming also.

The scheduler 16 receives the instruction operations dispatched by the fetch/decode unit 14, and may monitor source operands of a given instruction operation to determine when it can be scheduled. The scheduler 16 may schedule the instruction operation, but may retain the instruction operation in case a replay event is detected. Generally, replay may comprise any mechanism which, in response to a replay event that indicates that the instruction may not have produced a correct result in execution, permits that instruction operation to be re-executed without refetching the instruction (and subsequent instructions in program order) from the instruction cache and/or memory. The scheduler 16 may be a centralized buffer which schedules all instructions, or may be distributed to execution resources (e.g. reservation stations). Scheduled instruction operations are transmitted to the EXU 20 or the AGU 22, in this embodiment.

The EXU 20 may comprise circuitry to execution arithmetic, logic, shift, and other non-memory operations. Specifically, in one embodiment, the EXU 20 may be configured to execute integer operations. Floating point operations may be executed in a floating point unit (not shown). The EXU 20 may receive source operands from the register file 18, the operation to execute from the scheduler 16, and the ATV of the operation from the scheduler 16 as well. As mentioned previously, operand forwarding may also be supported via an operand forwarding network (not shown). The EXU may broadcast the tag of the instruction operation (which identifies the destination of the instruction operation in the register file 18 and thus can be compared to the source operands) to the scheduler 16 so that dependent operations may be scheduled and may receive the execution result. Additionally, the EXU 20 may broadcast the ATV of the operation to the scheduler 16 so that the ATVs of dependent operations may be updated. Similarly, the data cache 24 may broadcast tags and ATVs of memory operations being executed ("Broadcast ATVs" in FIG. 1 from both the EXU 20 and the AGU 22). The AGU 22 may receive operands and the memory operation, and may generate the address of the memory location accessed by the load/store operation. The address is provided to the data cache 24 for access.

The data cache 24 is configured to determine if a load operation hits in the cache, and is configured to transmit status indicating whether the data speculation that was performed to forward the data for the operation was correct. The status may indicate bad (data speculation incorrect) or good (data speculation correct). Additionally, the status ATV may be broadcast with the status ("Status, Status ATVs" in FIG. 1). The status ATV may be the ATV token assigned to the load (one-hot encoded). Data speculation may be incorrect if the load misses in the cache, or if translation is enabled and a translation lookaside buffer (TLB) miss is detected. Additionally, data speculation may be incorrect if the load hits a store in a store queue (shown in the data cache block 24 in FIG. 1, although the store queue may be physically separate from the data cache 24) and the store data cannot be forwarded to satisfy the load. For example, the store data may not have been provided yet, or the store may not update all of the bytes accessed by the load (and thus some bytes from the store queue and some bytes from the cache or memory are needed to complete the load).

In the illustrated embodiment, the scheduler includes the source buffer 30 to store the source register addresses for the source operands of each instruction operation and the ATV buffer 32 to store the corresponding ATVs. That is, each instruction operation in the scheduler 16 may be assigned an entry in the source buffer 30 and the corresponding entry in the ATV buffer 32. An additional buffer may store other information, such as the instruction operation itself, or that information may be also be stored in the source buffer 30.

An exemplary entry 38 is shown in the source buffer 30, and may include one or more source register addresses (e.g. up to four source addresses for a given instruction operation, labeled SRC1 to SRC4, although other embodiments may have more or fewer source operands per instruction operation). Additionally, a matched-previously (MP) bit may be maintained for each source operand, indicating that the source has previously matched a tag and thus is resolved. Once a given instruction operation's source operands have all been resolved, the instruction operand may request scheduling. The per entry logic 40 may detect that the instruction operation in entry 38 has resolved its sources and may generate a request to schedule (e.g. Raw_Req[i] in FIG. 1, for entry 38). More particularly, in one embodiment, the source register address fields in the entry may comprise content addressable memory (CAM), and a match may be detected using the CAM to compare between a tag broadcast from the execution resources and the stored register address. The per entry logic may detect that all source operands are resolved to make the request. The MP bit may also be set when the match is detected. If an instruction operation has been scheduled, the picked ("P") bit may be set to prevent subsequent requests for that instruction operation. Thus, a request may be made if all source operands have been resolved and the instruction operation has not be previously picked. The per entry logic 40 may be replicated for each entry in the source buffer 30.

The request from each entry of the source buffer 30 is shown as the Raw_Req[0 . . . n] signal, for an n+1 entry scheduler 16. That is, an n+1 entry scheduler 16 may include n+1 entries similar to entry 38 in the source buffer 30, and n+1 entries similar to the entry 42 in the ATV buffer 32. The source buffer 30 may output a tag match signal for each entry (Tag_Match[0 . . . n]) indicating that a tag match has been detected. The ATV buffer 32 may receive the tag match signals to update ATVs in the ATV buffer 32 with the broadcast ATVs. The broadcast ATVs are provided by the execution resources at the same time the tag broadcast occurs. Each entry that is matched by the broadcast tag is updated to include the broadcast ATV (e.g. the broadcast ATV may be logically ORed with the broadcast ATV). In this fashion, the ATV of a given instruction operation may be dynamically generated as each source operand of that given instruction resolves. Generally, a source operand may be resolved if the source operand is know to be available or predicted to be available prior to the instruction operation that has the source operand reaching execution. For example, a source operand may be resolved if it is stored in the register file 18, will be stored in the register file 18 prior to a register file read, and/or available for forwarding in the pipeline (e.g. at the input to the EXU 20).

The request signals from the source buffer 30 are qualified by the request qualify logic 34. The request qualify logic 34 may be essentially a bitwise logical AND of the raw request signals and corresponding kill signals. In the illustrated embodiment, the kill signals (Kill[0 . . . n]) are asserted to suppress the corresponding request, and thus the inverse of the kill signal is ANDed. Other embodiments may generate the kill signal active low, and no inversion may be needed.

The ATV buffer 32 may include per entry logic 44 to generate the kill signals (and to update the ATVs). To generate the kill signals, the ATV buffer 32 may receive the status broadcast and status ATV (which may be the ATV token assigned to the load). The per entry logic 44 may compare the received status ATV to the ATV in the corresponding entry 42. If the status ATV is represented in the stored ATV and the status is bad (data misspeculation), the per entry logic 44 may assert the kill signal (Kill[i]) for that entry.

In addition to suppressing the request for an instruction operation if the ATV matches the status ATV, the scheduler 16 may use the kill signal to set the picked bit in the corresponding entry 38. The picked bit may prevent scheduling of the instruction operation once bad status has been reported for an ancestor of that instruction operation, as indicated in the ATV at the time the status is reported. The picked bit may be reset on the next tag match in the entry, whether or not the next tag match is for the same source operand for which bad status was reported. Such an embodiment may permit scheduling of requests, if the next tag match is not for the same source operand, in cases in which the bad status has not yet been cleared. An instruction thus scheduled is replayed. Other embodiments may be more specific with the bad status, associating it with a particular source operand (so that matching on other source operands does not cause the instruction operation to be rescheduled) or sharing bad status recording among a subset of the operands to conserve space. In such embodiments, the scheduling request can be suppressed until the previously bad source operand is again forwarded.

The qualified request signals (Req[0 . . . n]) may be supplied to the pick logic 36, which may schedule one or more instruction operations. The picked operations are communicated to the buffers 30 and 32, which supply the corresponding source addresses to the register file 18 and ATVs to the execution resources, respectively. The scheduler 16 also provides the instruction operations themselves (shown as Ops in FIG. 1, input to the execution resources).

The term instruction operation may generally refer to any operation that execution resources within the processor 10 may execute. Instruction operations may have a one-to-one mapping to instructions specified in an instruction set architecture that is implemented by the processor 10. The instruction operations may be the same as the instructions, or may be in decoded form. Alternatively, instructions in a given instruction set architecture (or at least some of the instructions) may map to two or more instruction operations. In some cases, microcoding may be implemented and the mapping may comprise a microcode routine stored in a microcode read-only memory (ROM). In other cases, hardware may generate the instruction operations, or a combined approach of hardware generation and microcoding may be used. Load instruction operations may correspond to explicit load instructions or may be implicit in an instruction that specified a memory source operand to be read by the processor. Similarly, store instruction operations may correspond to explicit store instructions or may be implicit in an instruction that specified a memory destination operand to be written by the processor.

Execution resources may generally refer to any hardware circuitry the performs all or part of the execution of an instruction operation. For example, the EXU 20, the AGU 22, and the data cache 24 may comprise execution resources. An execution resource may be designed to accept one or more instruction operations per clock cycle. There may be any number of various types of execution resources in various embodiments. Thus, the source buffer 30 may be configured to receive and resolve multiple tag broadcasts per clock cycle and the ATV buffer 32 may be configured to receive multiple broadcast and/or status ATVs per clock cycle.

The instruction cache 12 and the data cache 24 may comprise any configuration (set associative, direct mapped, etc.) and any desired capacity. An external interface unit (not shown) may coordinate the fetching of data/instructions into the caches when a cache miss occurs. The register file 18 may comprise any type of memory configured as a register file (e.g. random access memory, registers, etc.).

The buffers 30 and 32 may comprise any memory. In one embodiment, the memory may comprise RAM and/or CAM, or a combination thereof. Some or all of the per entry logic 40 and 44 may be part of the CAM, or may be logic separate from the memory or integrated into the circuitry forming the memory.

Turning now to FIG. 2, a pipeline diagram is shown illustrating a portion of an exemplary pipeline that may be implemented by one embodiment of the processor 10. Other embodiments may have more or fewer pipeline stages, as desired. Stages are delimited by vertical lines in FIG. 1, and stages for different ops that occur in the same clock cycle are vertically aligned. There may be more pipeline stages in the full pipelines, such as stages prior to the SC stage for fetching and decoding (and perhaps renaming) instructions.

The SC stage is the scheduling stage at which an instruction operation is scheduled (i.e. the pick logic 36 picks the instruction operation and the scheduler entry of the picked instruction operation is read in the SC stage). The RF stage is the register file read stage at which source operands are read from the register file. Operand forwarding from previous operations may also occur at the end of the register file read stage. The AG/EX stage is the address generation stage (for memory operations) at which the AGU 22 generates the address to be accessed or the execution stage (for non-memory operations) at which the instruction operation is executed. The DC1 to DC4 stages are the data cache access stages. In the DC1 and DC2 stages, the data cache data array is accessed, and data is forwarded from the DC2 stage. In the DC3 and DC4 stages, the translated address is tag-matched to the data cache tag and hit/miss is determined as well as whether or not other issues exist such as forwarding from the store queue. Status is broadcast in the DC4 stage.

FIG. 2 illustrates a load progressing through the pipeline (Load Op in FIG. 2) and an instruction operation dependent on the load. The dependent operation can be any type of operation (memory or non-memory). The tag broadcasts may generally be timed so that, if a dependent operation is immediately scheduled, the dependent operation will receive the result data through operand forwarding into the EX or AG stage. That is, the tag broadcasts may be timed to permit maximum overlap in the pipeline of an instruction operation and its dependent operation. In this embodiment, the tag broadcast occurs two clocks before the data is transmitted, covering the SC and RF stages. Thus, the load op has its tag broadcast from the AG stage, which may cause the dependent operation to schedule in the next clock cycle (at earliest). The tag broadcast is illustrated in FIG. 2 via the arrow labeled "Tag". Two clocks later, the data is transmitted (arrow labeled "Data" in FIG. 2), thus being available to the dependent operation at the AG/EX stage. In this embodiment, the status is available 2 clocks after the data is transmitted (arrow labeled "Status" in FIG. 2).

Accordingly, the distance between the tag broadcast and the corresponding status may define a "replay window" within which the replay status of a load (and thus its dependent operations) is not known (shown as D in FIG. 2, and equal to four in this embodiment). The size of the replay window may be a component in the minimum size of the ATV to uniquely track each load that can be simultaneously have its replay status unknown. Particularly, as shown in the equation at the bottom of FIG. 2, the ATV size may be at least the width of the replay window multiplied by the load issue width (i.e. the number of loads that can be scheduled in the same clock cycle). In one embodiment, the load issue width may be two, and thus the ATV size would be eight. Thus, ATVs formed of bit vectors would be eight bits for this example.

FIG. 3 is a table illustrating various events in one embodiment of the processor and the ATV effects related to those events for one embodiment. The first event shown in the table is a dispatch of an instruction operation to scheduler entry i, including entry i in both the source buffer 30 and the ATV buffer 32. The instruction operation is written to the entry, and the ATV in that entry (ATV[i]) is set to the null value by the per entry logic 44 (zero, in this case). Alternatively, the fetch/decode unit 14 may supply the null value to be written to the ATV buffer 32 to be written to entry i.

To form a broadcast ATV to be transmitted during a tag broadcast for a load operation, the AGU/data cache is configured to broadcast an ATV that is the logical OR of the ATV from the load operation's entry in the scheduler (provided by the ATV buffer 32 in response to the scheduling of the load operation) and the ATV assigned by the ATV assign unit 26 (the one hot token that identifies the load operation in the ATV). Thus, the broadcast ATV reflects the load operation itself, as well as preceding replayable operations. To form a broadcast ATV for other instruction operations, the EXU or AGU/data cache may broadcast the ATV from that instruction operation's entry in the scheduler, again provided by the ATV buffer 32 in response to scheduling the operation.

In response to a tag match on a tag broadcast for entry i in the scheduler 16, the ATV buffer 32 may update the ATV in entry i with the broadcast ATV. In this fashion, direct and indirect dependencies on replayable operations may be dynamically recorded. As illustrated in FIG. 3, the update may comprise a logical OR by the per entry logic 44 of ATV[i] and the broadcast ATV.

For a status broadcast for a load, the status ATV may be the ATV assigned by the ATV assign unit 26. That is, the status ATV may be the one hot token identifying the load in the ATV. In response to a status broadcast, if the status ATV is represented in the ATV of entry i, the per entry logic 44 may generate the Kill[i] signal and may update the ATV[i]. Particularly, the Kill[i] signal is asserted if the status ATV is represented in the entry and the status is indicated as bad (i.e. a replay event has been detected). In either case, the ATV[i] may be updated to delete the load from the ATV (e.g. bit wise AND with the inverse of the status ATV). Thus, the link between the load operation and the instruction operation in entry i is removed. As illustrated in FIG. 3 for this embodiment, the load is represented in ATV[i] if the bitwise AND of the status ATV and ATV[i] is non-zero.

Figure 4:
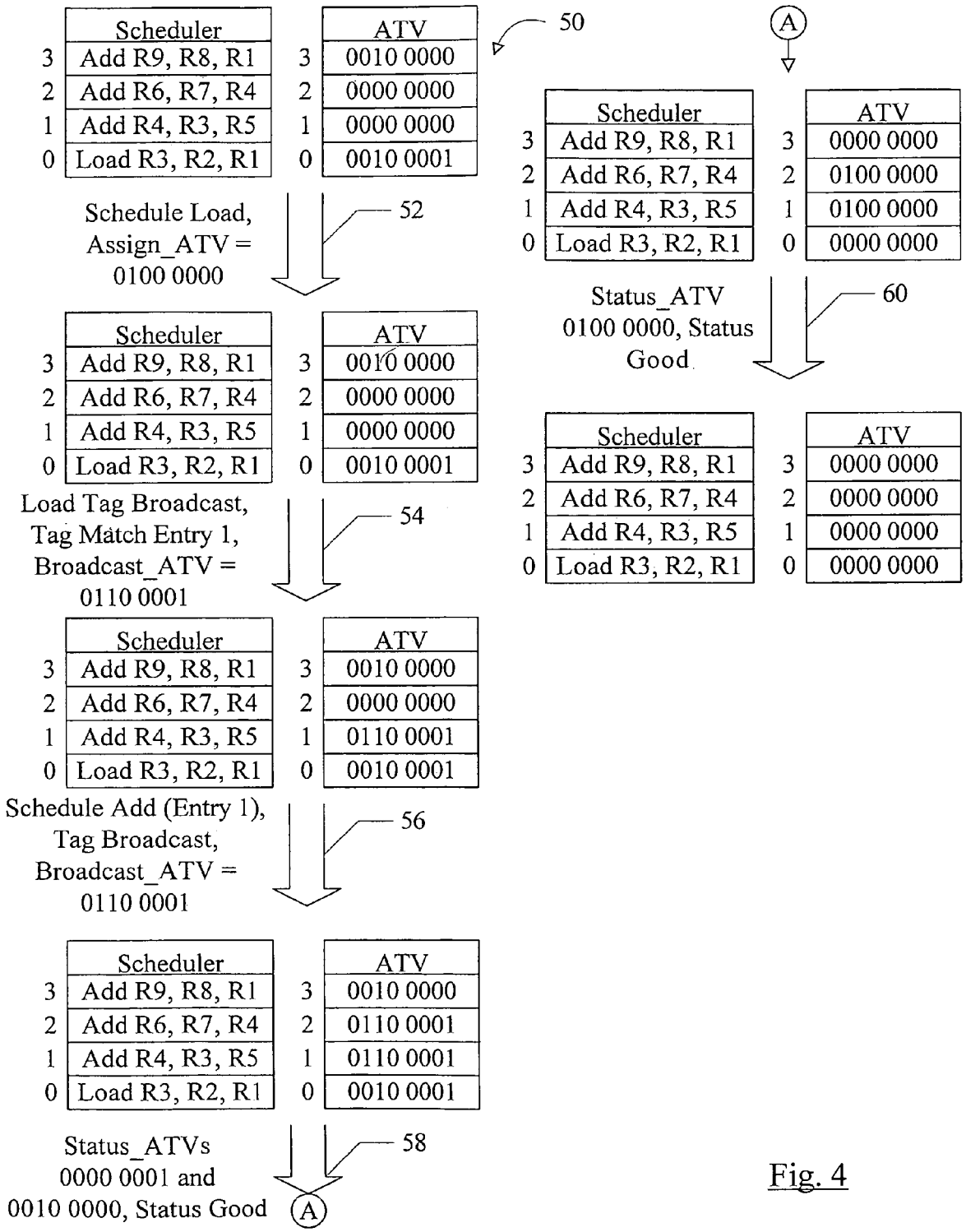
FIG. 4 is an example of several instructions and the generation of ancestor tracking vectors (ATVs) for the instructions.

Turning now to FIG. 4, an example of several instructions in the scheduler is shown for one embodiment. Four scheduler entries numbered 0, 1, 2, and 3 are shown. The instruction operation in entry 0 is prior to the instruction operations in entries 1-3 in program order; the instruction operation in entry 1 is prior to the instruction operations in entries 2-3 in program order; etc. Each instruction operation is listed with a mnemonic (Load or Add, in this example), the destination register of the instruction operation, and the source registers of the instruction operation. One destination and two sources are shown in this example. The ATVs for each instruction operation for this example are also shown. An initial state of the example illustrates a load having an ATV representing two prior loads, null ATVs for the Adds in entries 1 and 2, and an ATV for the Add in entry 3 that represents one prior load (which is the same as one of the prior loads represented in the ATV for entry 0). ATVs are shown in binary in this example, with eight bits. The initial state is represented at reference numeral 50.

The load is scheduled, and the ATV assign unit 26 assigns ATV=0100 0000 (in binary) to the load (arrow 52). No update to the initial state occurs at this point. Subsequently, the load reaches the tag broadcast stage and broadcasts an ATV formed from its own ATV (0010 0001) and the ATV assigned to the load by the ATV assign unit 26 (0100 0000). Thus, the broadcast ATV is 0110 0001 (arrow 54). Since the Add in entry 1 has R3 (the destination of the load) as a source, a tag match in entry 1 is detected and the ATV in entry 1 is updated to 0110 0001. Subsequently, the Add from entry 1 is scheduled and broadcasts its tag and ATV (arrow 56). A tag match in entry 2 is detected, and the ATV in entry 2 is updated.

The status for ATVs 0000 0001 and 0010 0000 are broadcast, both indicating good status (arrow 58). The ATVs are deleted from the stored ATVs. Thus, both the load in entry 0 and the Add in entry 3 have null ATVs after the status broadcasts. Subsequently, the status for the load (status ATV=0100 0000) is broadcast, also indicating good status (arrow 60). Thus, the resulting ATVs are all null.

Had the status been bad in one of the status broadcasts, the results on the ATV would be similar, but the matching instructions would have inhibited their scheduling requests. Accordingly, scheduling of instructions that would otherwise be replayed by be suppressed until the load operation replays and matches the tag of the instruction operations again.

Figure 5:
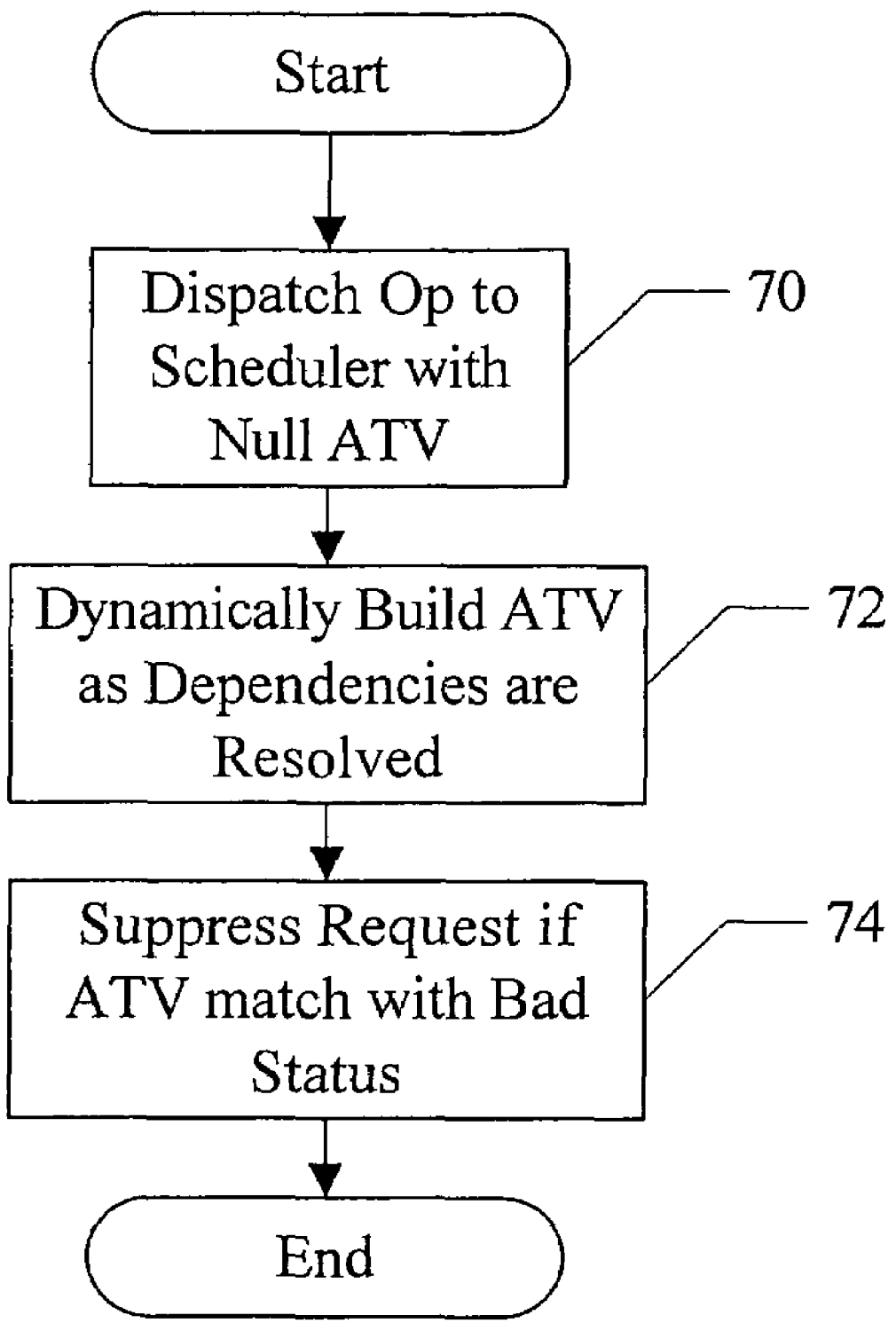
FIG. 5 is a flowchart illustrating one embodiment of ATV generation and use.

Turning now to FIG. 5, a flowchart is shown illustrating a method of using ATVs. An instruction operation is dispatched to the scheduler and a Null ATV is established for the instruction operation (block 70). The ATV is dynamically built as dependencies of the instruction operation are resolved (block 72). The scheduling request for the op is suppressed if an ATV match on a status broadcast is detected and bad status is reported (block 74). The request may be suppressed in the cycle that the status broadcast occurs via assertion of the kill signal. In subsequent cycles, in one embodiment, the request may be suppressed by setting the picked bit for the instruction operation. Alternatively, bad status may be tracked in the source buffer and may be used to suppress the request until good status is detected.

Figure 6:
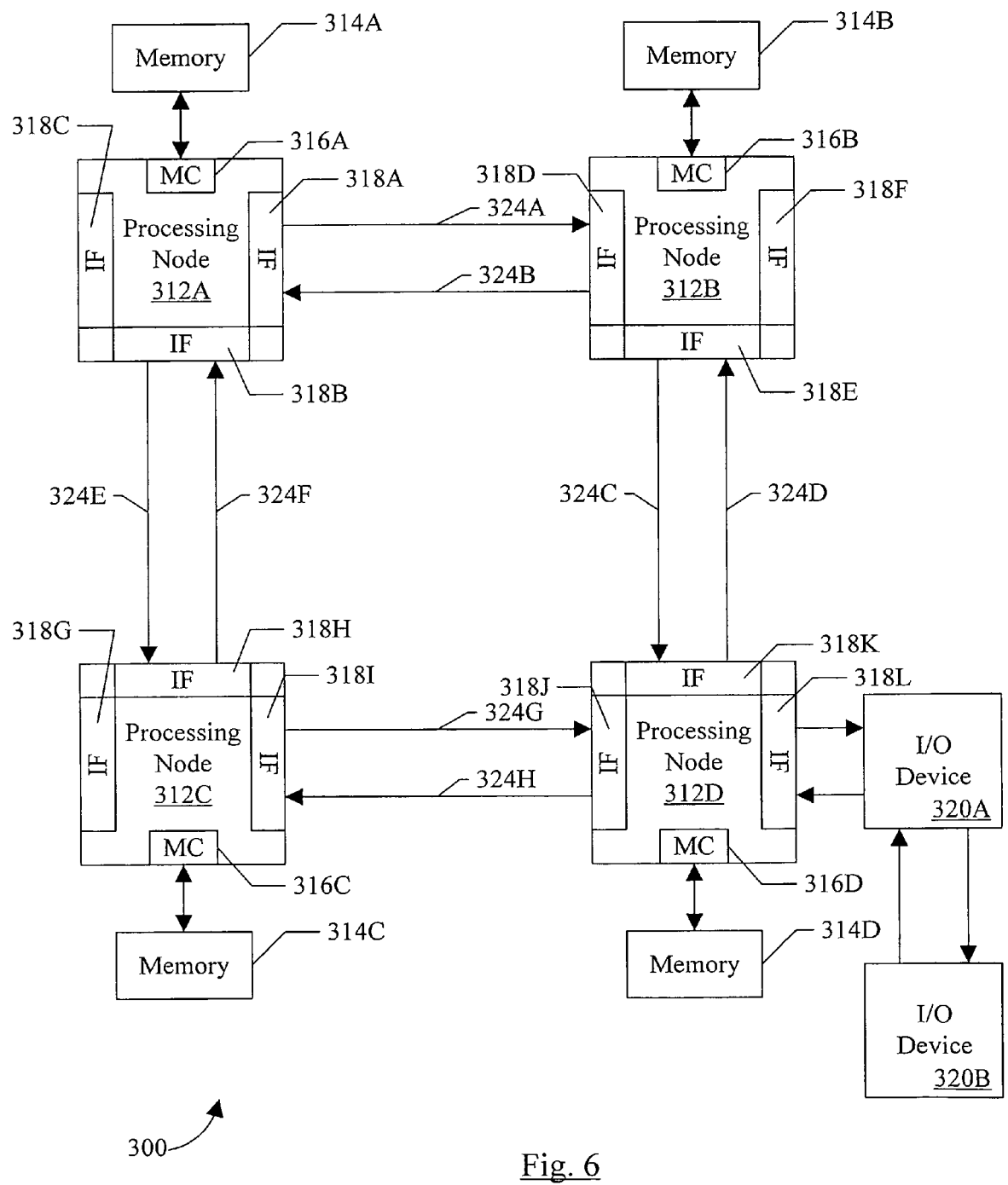
FIG. 6 is a block diagram of one embodiment of a computer system.

Turning now to FIG. 6, another embodiment of a computer system 300 is shown. In the embodiment of FIG. 6, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may, include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various structural and operational details shown in FIGS. 2-5). One or more processors may comprise a chip multiprocessing (CMP) or chip multi-threaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

Numerous variations and modifications will become apparent to those skilled in the art once the above disclosure is fully appreciated. It is intended that the following claims be interpreted to embrace all such variations and modifications.

What is claimed is:

1. A processor comprising:
   one or more execution resources configured to execute instruction operations, wherein the execution resources comprise hardware circuitry configured to perform at least part of the execution of instruction operations; and
   a scheduler coupled to the execution resources and configured to maintain an ancestor tracking vector (ATV) corresponding to each given instruction operation in a memory circuit in the scheduler, wherein the ATV identifies instruction operations which can cause the given instruction operation to replay, wherein a replayed instruction operation is reexecuted without being refetched, and wherein the scheduler is configured to set the ATV of each given instruction operation to a null value in the memory circuit in response to the given instruction operation being dispatched to the scheduler, and wherein the scheduler is configured to modify the ATV of the given instruction operation dynamically to insert ATVs corresponding to instruction operations which resolve source operands of the given instruction operation responsive to destination tags of the instruction operations that resolve the source operands, wherein the destination tags are broadcast by the execution resources during execution of the instruction operations that resolve the source operands, and wherein the scheduler is configured to modify the ATV of the given instruction operation to remove ATV tokens assigned to instruction operations for which a replay status is determined, wherein the ATV tokens of the instruction operations are removed independent of whether or not the replay status indicates replay.

2. The processor as recited in claim 1 wherein the ATV token uniquely identifies the executed instruction operation among a subset of instruction operations within a replay window that can cause replay.

3. The processor as recited in claim 2 wherein, if the ATV token is represented in the ATV for the given instruction operation and the replay status indicates that a replay is detected for the executed instruction operation, the scheduler is configured to suppress a potential scheduling request corresponding to the given instruction operation.

4. The processor as recited in claim 3 wherein the scheduling request is suppressed until a subsequent destination tag broadcast that matches a source operand tag in the scheduler for the given instruction operation.

5. The processor as recited in claim 2 wherein the ATV token is assigned to the executed instruction operation in response to the scheduler scheduling the executed instruction operation for execution.

6. The processor as recited in claim 2 wherein the executed instruction operation is a load.

7. The processor as recited in claim 6 wherein the replay occurs of data for the load is misspeculated.

8. The processor as recited in claim 7 wherein the destination tag broadcast for the load is timed assuming a cache hit for the load in a data cache, and wherein the data for the load is misspeculated if the load is a cache miss in the data cache.

9. The processor as recited in claim 1 wherein, in response to a first instruction operation that resolves a source operand of the given instruction operation causing a replay, the scheduler is configured to reissue the first instruction operation, and wherein a new ATV token is assigned to the first instruction operation in response to reissuing the first instruction operation, and wherein the scheduler is configured to insert the ATV corresponding to the first instruction operation, which includes the new ATV token, into the ATV of the given instruction operation in response to the broadcast of the destination tag of the first instruction operation during reexecution of the first instruction operation.

10. The processor as recited in claim 9 wherein the new ATV token is different from a previous ATV token that was assigned to the first instruction operation.

11. The processor as recited in claim 1 wherein the ATV corresponding to an instruction operation that resolves a source operand of the given instruction operation comprises an ATV from a scheduler entry that corresponds to the instruction operation that resolves the source operand.

12. The processor as recited in claim 11 wherein the ATV corresponding to the instruction operation that resolves the source operand of the given instruction operation further comprises an ATV token assigned to the instruction operation during execution of the instruction operation.

13. A scheduler comprising:
  a buffer memory circuit comprising a plurality of entries, wherein each entry of the plurality of entries corresponds to a different instruction operation of a plurality of instruction operations that can be stored in the scheduler, and wherein a given entry of the plurality of entries is configured to store one or more source tags corresponding to source operands of a given instruction operation in the scheduler, wherein the given instruction operation is assigned to the given entry;
  an ancestor tracking vector (ATV) buffer memory circuit comprising a second plurality of entries, wherein each entry of the second plurality of entries corresponds to the different instruction operation, and wherein a given second entry of the second plurality of entries is assigned to the given instruction operation and is configured to store an ATV corresponding to the given instruction operation, wherein the ATV identifies instruction operations which can cause the given instruction operation to replay and wherein a replayed instruction operation is reexecuted without being refetched; and
  logic coupled to each entry of the second plurality of entries, wherein the logic is configured to set the ATV of each given instruction operation to a null value in the ATV buffer memory circuit in response to the given instruction operation being dispatched to the scheduler, and wherein the logic is configured to dynamically modify the ATV of the given instruction operation to insert ATVs corresponding to instruction operations which resolve source operands of the given instruction operation responsive to destination tags of the instruction operations that resolve the source operands, wherein the destination tags are broadcast during execution of the instruction operations that resolve the source operands, and wherein the scheduler is configured to modify the ATV of the given instruction operation to remove ATV tokens assigned to instruction operations for which a replay status is determined, wherein the ATVs of the instruction operations are removed independent of whether or not the replay status indicates replay.

14. The scheduler as recited in claim 13 coupled to receive a replay status of the executed instruction operation along with an ATV token assigned to the executed instruction operation, wherein the ATV token uniquely identifies the executed instruction operation among a subset of instruction operations within a replay window that can cause replay, and wherein, if the ATV buffer is configured to determine if the ATV token is represented in the ATV for the given instruction operation.

15. The scheduler as recited in claim 14 wherein the scheduler comprises additional logic that is configured, if the replay status indicates that a replay is detected for the executed instruction operation, to suppress a potential scheduling request corresponding to the given instruction operation.

16. A method comprising:
  dispatching an instruction operation to a scheduler, wherein the scheduler comprises a memory circuit configured to store the instruction operation;
  setting an ancestor tracking vector (ATV) corresponding to the instruction operation to a null value in the memory circuit responsive to the dispatching; and
  dynamically updating the ATV in the memory circuit to insert an ATV corresponding to an executed instruction operation that resolves a source operand of the instruction operation, the updating responsive to a broadcast of a destination tag corresponding to the executed instruction operation during execution of the executed instruction operation; and
  dynamically updating the ATV in the memory circuit to delete an ATV token assigned to the executed instruction operation responsive to a replay status of the executed instruction operation being determined and independent of whether or not the replay status indicates replay, and wherein a replayed instruction operation is reexecuted without being refetched.

17. The method as recited in claim 16 further comprising:
  dispatching another instruction operation for execution, the other instruction operation being capable of causing a replay; and
  assigning an ATV token to the other instruction operation responsive to scheduling the instruction operation for execution.

18. The method as recited in claim 17 further comprising:
  receiving a replay status corresponding to the other instruction operation; and
  receiving the ATV token corresponding to the instruction operation.

19. The method as recited in claim 18 further comprising suppressing a potential scheduling request responsive to the ATV token being represented in the ATV of the instruction operation and further responsive to the ATV status indicating replay.

* * * * *